(12) United States Patent
McCune

(10) Patent No.: US 8,033,561 B2
(45) Date of Patent: Oct. 11, 2011

(54) SWAY CONTROL DEVICE FOR TRAILERS

(75) Inventor: Bernard John McCune, Strathmore (AU)

(73) Assignee: Bernard John McCune, Strathmore (AU)

( * ) Notice: Subject to any disclaimer, the term of this patent is extended or adjusted under 35 U.S.C. 154(b) by 182 days.

(21) Appl. No.: 12/063,354

(22) PCT Filed: Aug. 10, 2006

(86) PCT No.: PCT/AU2006/001140
§ 371 (c)(1),
(2), (4) Date: Jun. 24, 2009

(87) PCT Pub. No.: WO2007/016745
PCT Pub. Date: Feb. 15, 2007

(65) Prior Publication Data
US 2010/0052290 A1 Mar. 4, 2010

(30) Foreign Application Priority Data

Aug. 10, 2005 (AU) .................... 2005904320

(51) Int. Cl.
*B60D 1/32* (2006.01)
(52) U.S. Cl. .................................... 280/455.1
(58) Field of Classification Search ............... 280/455.1;
188/266.1, 266.2
See application file for complete search history.

(56) References Cited

U.S. PATENT DOCUMENTS

| | | | | |
|---|---|---|---|---|
| 3,502,351 | A * | 3/1970 | Gray | 280/455.1 |
| 3,531,139 | A * | 9/1970 | Hedgepeth | 280/455.1 |
| 3,697,099 | A * | 10/1972 | Potts et al. | 280/455.1 |
| 3,787,077 | A * | 1/1974 | Sanders | 280/455.1 |
| 3,948,544 | A | 4/1976 | Presley et al. | |
| 6,283,489 | B1 * | 9/2001 | Hoog | 280/455.1 |
| 6,386,571 | B1 * | 5/2002 | Vollmer et al. | 280/455.1 |
| 6,722,682 | B2 * | 4/2004 | Valliere et al. | 280/405.1 |
| 7,029,020 | B2 * | 4/2006 | Adams | 280/455.1 |
| 7,035,836 | B2 * | 4/2006 | Caponetto et al. | 706/47 |

FOREIGN PATENT DOCUMENTS

GB 2038259 7/1980

OTHER PUBLICATIONS

International Search Report for application No. PCT/AU2006/001140, dated Sep. 1, 2006.

* cited by examiner

*Primary Examiner* — Tony H. Winner
(74) *Attorney, Agent, or Firm* — Marshall, Gerstein & Borun LLP; Richard M. LaBarge

(57) ABSTRACT

A new apparatus for reducing sway of a trailer towed by a towing vehicle has a draw bar for linking a trailer to a vehicle, a ball for hitching the trailer to the draw bar, and a pin for hitching the draw bar to the vehicle. The apparatus also has a body that is associated with the ball in such a way that horizontal angular movement of the draw arm relative to the draw bar causes a substantially equivalent horizontal angular movement of the body relative to the draw bar. A hydraulic dampener linked to the body dampens horizontal angular movement of the body and, thereby, dampens horizontal angular movement of the trailer.

10 Claims, 3 Drawing Sheets

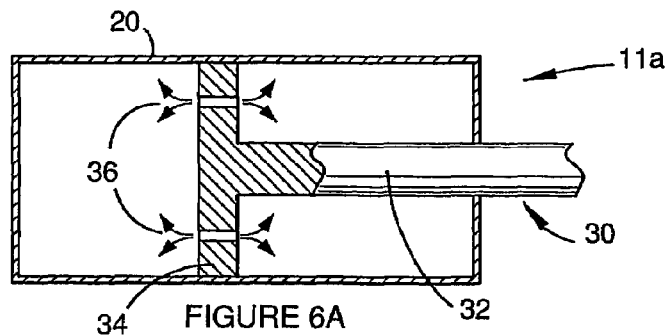
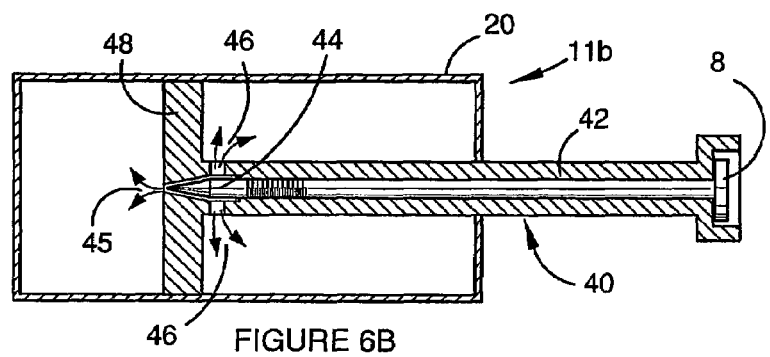
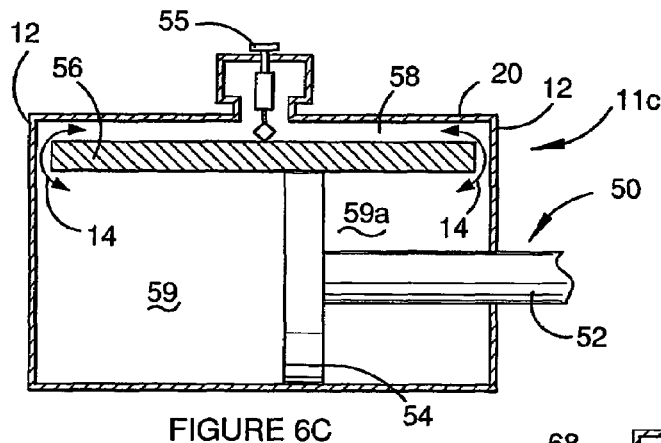
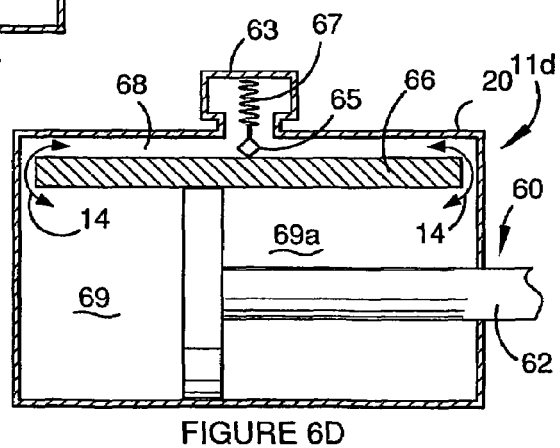

SWAY CONTROL DEVICE FOR TRAILERS

FIELD OF THE INVENTION

The present invention relates to trailer hitches and, more specifically, to trailer hitches for reducing or preventing a trailer, under tow, from swaying behind a towing vehicle.

BACKGROUND OF THE INVENTION

The term trailer as used herein refers to any form of towed vehicle, including an open tray trailer and a caravan.

Sway or oscillation of a trailer behind a vehicle is not an uncommon occurrence and can be a result of the actions of the driver, the condition of the road, other traffic, the weather or a combination of these or other factors. The results of an uncontrolled oscillation (commonly referred to fishtailing) can lead to serious damage to the trailer or vehicle and even to the occupants of the vehicle.

A variety of solutions have been proposed in order to resolve the problem of swaying movement of a trailer behind a vehicle. Some solutions involve controlled breaking of the trailer and other solutions involve devices for dampening the swaying movement. The present invention is directed to dampening swaying movement.

U.S. Pat. No. 6,283,489 to Hoog discloses an arrangement for reducing the sway of a trailer that is attached to a towing vehicle.

The arrangement comprises a towing beam that is disposed generally parallel to the bumper of a vehicle and has approximately the same length as the bumper. The towing beam includes a plate that extends from an extreme side of the beam, i.e. offset from a drawing arm of the trailer. The trailer is hitched to the beam by a towing arm that is modified to receive a first end of two extendible piston-type dampeners. The plate receives a second end of each piston-type dampener. Accordingly, any angular disposition of the trailer arm relative to the beam is resisted by the dampeners.

Although assisting to reduce sway of a trailer behind the vehicle, this arrangement suffers several draw backs.

The dampeners resist the extent to which the trailer can be angularly displaced relative to the vehicle in both horizontal and vertical directions.

In terms of restrictions on horizontal movement, this arrangement limits the extent to which the vehicle can turn around sharp corners and limits the manoeuvrability of the trailer relative to the vehicle. That is, the dampeners compress only to a certain extent at which point the dampeners form of rigid link between the vehicle and the arm of the trailer to prevent further angular displacement of the trailer relative to the vehicle. Any attempt to increase the angular displacement beyond this extent would result in destruction of the dampeners.

In terms of restrictions on vertical movement, the dampeners are fastened to the plate and the modified trailer by upright pins. While the pins permit the ends of the dampeners to pivot about a vertical axis of the pins, i.e. in a horizontal plane, the pins do not accommodate vertical angular movement of the vehicle relative to the trailer. Accordingly, the arrangement disclosed in Hoog does not account for pivoting the dampeners when the trailer is taken up a steep driveway, over a speed hump or down a boat ramp.

This arrangement also requires the dampeners to be attached either to the trailer or the vehicle each time the trailer is hitched to the vehicle. Similarly, the dampeners must be detached from the trailer or vehicle each time the trailer is unhitched from the vehicle. This is a nuisance when the trailer is frequently hitched and unhitched from the vehicle.

The dampeners in Hoog must be very stiff in order to resist movement of the trailer relative to the vehicle. However, if the dampeners are removed to enable unhitching of the trailer from the vehicle, the dampeners would be in a certain extended disposition. In order to refit the dampeners when hitching the trailer to the vehicle, the trailer must be disposed at the exact angular displacement relative to the vehicle when the dampeners were removed so the disposition of dampeners does not need adjustment to bridge the exact distance between the plate and the arm of the trailer. Alternatively, the disposition of the dampeners must be adjusted to bridge the exact distance between the plate and the arm of the trailer. In either case, this is a difficult task and makes the arrangement disclosed in Hoog difficult to use.

The arrangement disclosed in Hoog further requires a modification to be made to the vehicle and/or trailer to properly fit the arrangement and thereby have a sway-reducing effect. The need to modify the trailer and the vehicle contributes to an increased cost of using this arrangement. This is disincentive financially and modifications to the vehicle may be insightly.

SUMMARY OF THE INVENTION

The present invention is concerned with providing a sway dampening apparatus that alleviates, at least in part, one more of the above problems.

The present invention provides an apparatus for reducing sway of a trailer towed by a towing vehicle, the apparatus comprising:
  (a) a draw bar for linking a trailer to a vehicle, the draw bar having a first end and a second end;
  (b) first means for hitching a draw arm of the trailer to the draw bar;
  (c) second means for hitching the draw bar to the vehicle;
  (d) a body associated with the first means such that horizontal angular movement of the draw arm relative to the draw bar causes a substantially equivalent horizontal angular movement of the body relative to the draw bar; and
  (e) means linked to the body for dampening horizontal angular movement of the body and, thereby dampening horizontal angular movement of the trailer relative to the vehicle.

The dampening means is part of the apparatus and the apparatus is able to be located between a trailer and a towing vehicle to hitch the trailer to the vehicle Accordingly, the apparatus avoids the need to modify the trailer or the vehicle by fixing additional attachments to the trailer or vehicle that receive the dampening means. Therefore, the apparatus can be hitched to the vehicle with standard conventional trailer hitches and trailers are able to be hitched to the vehicle with standard conventional trailer hitches. Additionally, the apparatus enables trailers to be hitched to the vehicle and unhitched from the vehicle without having to couple dampening means to or uncouple dampening means from the trailer or vehicle.

By location of the apparatus between the trailer and the vehicle, the apparatus does not interfere with the horizontal or vertical angular displacement of the trailer relative to the vehicle. Therefore, the apparatus does not need to be removed when tight cornering or manoeuvring of the trailer is required, such as during parking the trailer or driving on roads with steep bends. Additionally, the ability of the apparatus to accommodate vertical angular movement of the trailer relative to the vehicle ensures that the apparatus is not limited to a select range of towing applications.

More preferably, the first and second means hitching means is conventional or standing hitching means. For example, the first means may comprise a tow ball or a pintle.

The body preferably includes a formation for coupling the body to the draw arm such that the horizontal angular movement of the draw arm relative to the draw bar causes the body to move with the draw arm.

Preferably the formation comprises a pair of spaced members that define a slot in which the draw arm is locatable, whereby the members are positioned closely adjacent to the draw arm when the draw arm is located in the slot such that horizontal angular movement of the draw arm drives a corresponding movement of the body through the member and such that the draw arm is free to move in the slot through a vertical angular displacement.

The members may be selectively positionable relative to each other to vary the width of the slot.

Preferably, the members are operable to clamp the draw arm.

Preferably the body comprises a platform that is pivotably mounted to the first means or to the draw bar at the first means for horizontal angular movement relative to the draw bar and the members comprise posts extending from the platform.

The dampening means is preferably mounted to the draw bar and the platform such that horizontal angular movement of the body relative to the draw bar due to movement of the draw arm relative to the vehicle causes the dampening means to resist the horizontal angular movement.

Preferably, the dampening means comprises a piston-type dampener and one end of the dampener is attached to the platform and the other end of the dampener is attached to the draw bar such that horizontal angular movement of the platform changes a distance between the ends of the dampener and causes the dampening means to resist the horizontal angular movement.

Preferably, the draw bar comprises a main bar and a side bar and one end of the dampener is attached to the side bar.

The resistance provided by the dampener is preferably adjustable.

The resistance may be controlled manually. Alternatively, a control means may control the resistance of the dampening means.

Preferably, the resistance is controlled by the control means in response to the speed of the vehicle and/or weight of the trailer.

Preferably, the control means controls the resistance such that the resistance is low at low vehicle speeds and the resistance is high at high vehicle speeds.

The dampening means may comprise a piston-type dampener comprising a fluid-filled body, a ram that extends into the body to define two chambers within the body, the ram having one or more than one aperture for the flow of fluid between the chambers and wherein the resistance of the dampener is controlled by adjusting the rate of fluid flow between the chambers.

More preferably, the fluid flow rate between the chambers is adjustable by controlling the size of the one or more than one aperture in the ram.

In an alternative form, the dampener may comprise a ram that cooperates with a wall disposed within the body to define two chambers within the dampener and the wall forms a channel for fluid flow between the two channels and wherein the resistance of the dampener is controlled by a valve located in the channel.

The valve may be manually adjusted or may be electronically adjusted from a remote location.

Electronic adjustment of the valve may comprise linking the valve to a solenoid for control by the control means.

BRIEF DESCRIPTION OF THE DRAWINGS

Embodiments of the invention will now be described, by way of example only, with reference to the accompanying drawings, in which:

FIGS. 6A, 6B and 6C and 6D are schematic cross-sectional views of hydraulic dampeners of the apparatus in FIGS. 1 and 3.

DETAILED DESCRIPTION OF EMBODIMENTS

Figure 1:
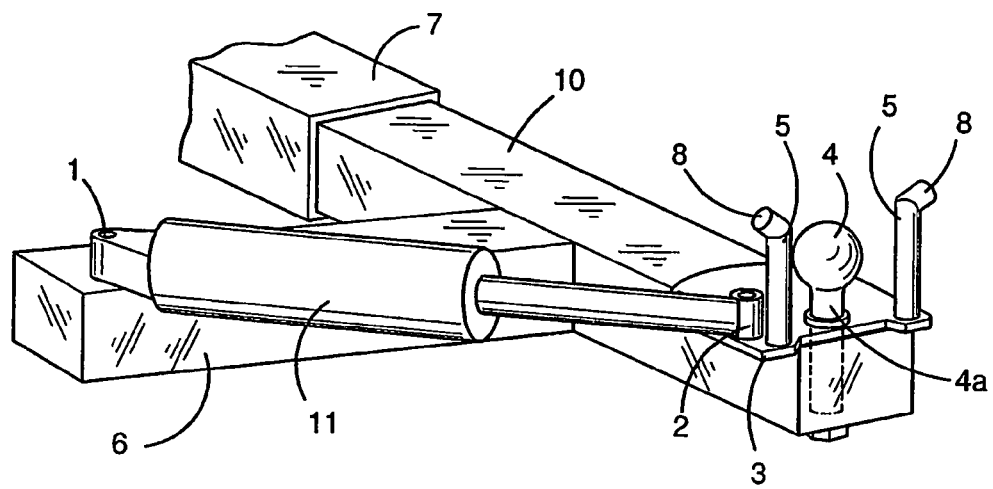
FIG. 1 is a perspective view of an apparatus in accordance with a first embodiment of the present invention.

An apparatus in accordance with a first embodiment of the present invention is illustrated in FIG. 1.

The apparatus comprises a draw bar 10, a first means for hitching a draw arm of a trailer to the draw bar 10 in the form of the conventional tow ball 4 and a second means for hitching the draw bar to the vehicle in the form of a locking pin (not shown). The apparatus further comprises a body in the form of a turntable 3 and a dampening means in the form of a shock absorber 11.

The draw bar 10 is formed of tubular steel in a square cross-section and in a dimension to slidably fit in a conventional sleeve hitch 7 for linking a draw bar to a vehicle.

It will be appreciated however that materials other than steel may be used to form the draw bar 10 provided the materials have sufficient strength for towing a trailer. Additionally, the draw bar 10 may have an alternative shape depending on the form of the first means and the second means for hitching the draw bar 10 to the vehicle and to the trailer.

The lock pin locks the draw bar 10 in the sleeve 7 attached to the vehicle. The tow ball 4 is located on an end of the draw bar 10 opposite to the end of the draw bar 10 that fits within the sleeve 7.

The turntable 3 has a generally flat plate structure with an aperture through which a neck portion 4a of the tow ball extends. The turntable 3, therefore, is able to rotate about the neck portion 4a of the tow ball 4. The turntable 3 includes upstanding posts 5 with outwardly divergent ends to guide a tow ball coupler 15 (FIG. 4) over the tow ball 4.

The spacing of the posts 5 is adjustable to define a slot of variable width between the posts 5. Adjustment of the spacing of the posts 5 enables the posts 5 to be brought into close proximity to respective sides of a draw arm 14 of a trailer (FIG. 2) to reduce free play in movement of the arm 14 relative to the turntable 3. Preferably, however, the posts 5 clamp the arm 14 to avoid all free play. Alternatively, a clamp may be substituted for the posts 5 to capture the arm 14.

The slot defined between the posts 5 is bound on three sides by the posts 5 and the turntable 3 and is open on the remaining side to receive the arm 14 of a trailer. The open space allows unrestricted movement of the arm through a vertical angular displacement relative to the turntable 3 and the draw bar 10.

Accordingly, vertical angular movement of the trailer relative to the vehicle is unrestricted so the apparatus can remain linked to the trailer and vehicle for use with vertically undulating terrain, such as over speed humps, and when transitioning between terrain of different inclinations, such as inclined driveways and boat ramps.

The turntable includes an upstanding lug 2 to which is attached a first end of the shock absorber 11. The lug is positioned such that the longitudinal axis of the dampener is slightly ahead of the tow ball 4 on the vehicle side of the draw bar 10.

The draw bar includes a side bar in the form of a beam 6 that extends generally perpendicularly from the draw bar 10 and includes an upstanding lug 1 near the free end of the beam 6. A second end of the shock absorber 11 is fixed to the lug 1.

The angular disposition of the shock absorber 11 relative to the draw bar 10 is affected by two competing factors. Advantageously, the shock absorber 11 is as close to perpendicular to the draw bar 10 as possible to maximize the draught of the shock absorber 11 and, therefore, the resistive effect of the shock absorber 11. Accordingly, when the amplitude of the sways is small, such as when the trailer starts swaying, the resistive effect of the shock absorber 11 has a greater impact. This factor, however, must be balanced with the need to position the lug 2 and the shock absorber 11 so interference with the turning capabilities of the vehicle relative to the trailer are not adversely affected. Preferably, the shock absorber 11 is disposed at an angle of 30-80° horizontally relative to the draw bar 10.

The shock absorber 11 comprises a hydraulic dampener of any conventional form or may comprise any one of shock absorbers 11a to 11d (FIGS. 6A to 6D).

Figure 2:
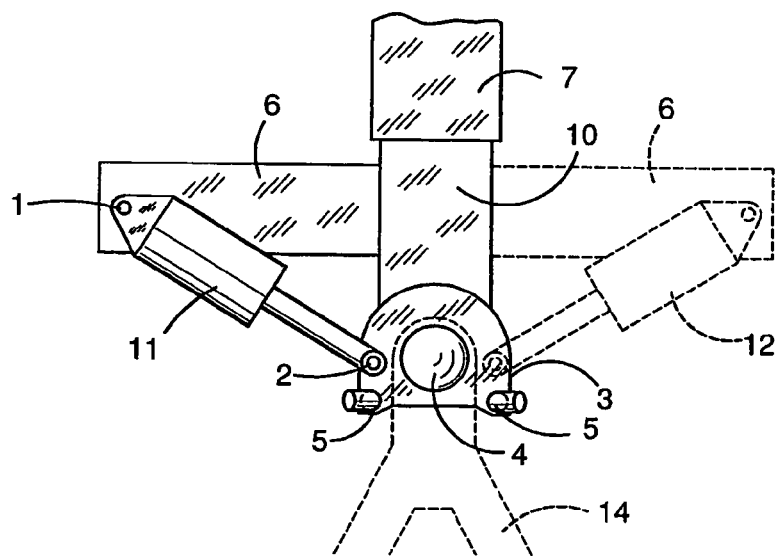
FIG. 2 is a top plan view of the apparatus of FIG. 1.

A trailer is hitched to the apparatus by locating the ball coupler 15 of the trailer arm 13 on the tow ball 4 (FIG. 2). The posts 5 are spaced sufficiently to receive the trailer arm 14 between with little free play such that horizontal movement of the trailer relative to the vehicle, arising from the vehicle navigating a bend in the road or a trailer swaying behind the vehicle, causes the trailer arm 14 to contact one of the posts 15 and rotate the turntable 3. Rotation of the turntable 3 changes the distance between lugs 1 and 2 and thereby causes the shock absorber 11 to extend or contract. The shock absorber 11 resists movement of the turntable 3. In turn, movement of the trailer arm and trailer relative to the vehicle about a horizontal angle is, therefore, resisted.

Depending upon the size of the trailer and the weight carried in the trailer, the apparatus may include a second arm 6 and second shock absorber 12 (dashed lines in FIG. 2) to increase the resistance forces on the turntable 3 and therefore reduce horizontal angular movement of the trailer arm 14 and the trailer relative to the vehicle.

Incorporation of the shock absorber 11 into the apparatus provides, in essence, a self-contained apparatus that can be simply fitted between a trailer and a vehicle. Significant modifications to the trailer or vehicle in order to fit the apparatus are avoided. Additionally, the tow ball 4 and locking pin enable the apparatus to be fitted to conventional hitching arrangements of trailers and vehicles.

As the apparatus is self-contained, there is no need to detach the shock absorber from a vehicle or trailer in order to decouple the trailer from the vehicle. The consequence of this is that there is no need to adjust the extension of the shock absorber to fit the distance between connection points of the shock absorber to a vehicle and/or a trailer.

Instead of adjusting the shock absorber 11 in order to obtain the requisite spacing between connection points of the shock absorber to the vehicle and/or trailer, it is necessary to ensure that the trailer and vehicle are returned to the angular displacement that they were at when the trailer was unhitched from the vehicle. The apparatus avoids this problem because the shock absorber 11 is not decoupled from the vehicle and/or trailer.

Figure 3:
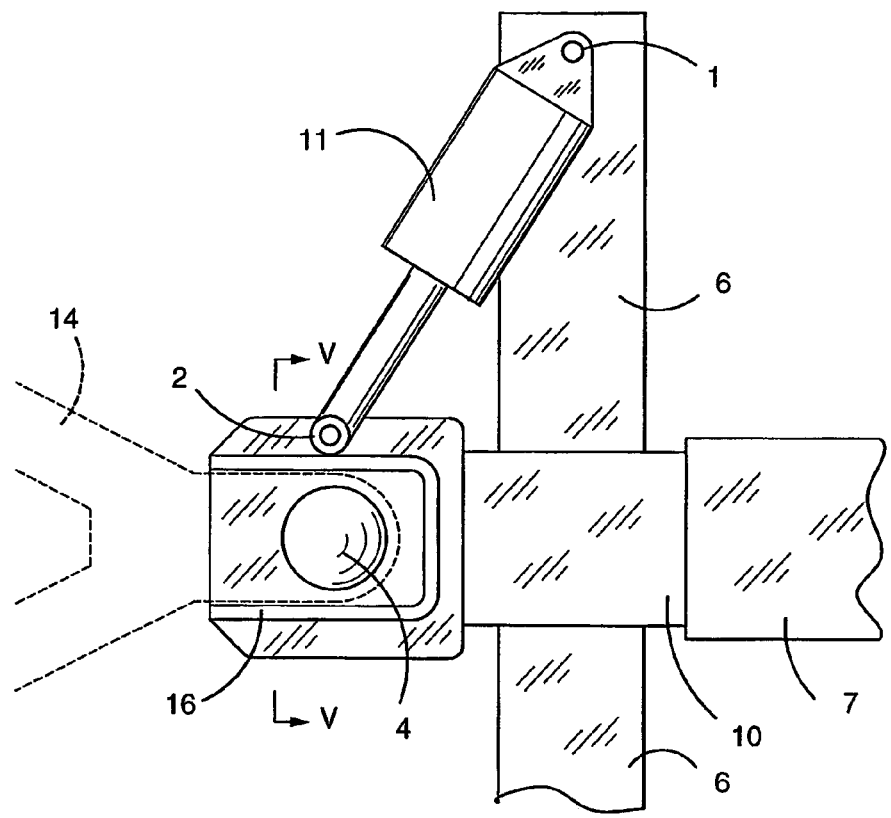
FIG. 3 is a top plan view of a second embodiment of an apparatus in accordance with the present invention.

A second embodiment of the invention is illustrated in FIG. 3. This embodiment is the same all respects to the first embodiment described above, save for the turntable 3.

The turntable does not include posts 5, but instead has an upstanding seat 16 comprising three walls in a U-configuration.

Figure 4:
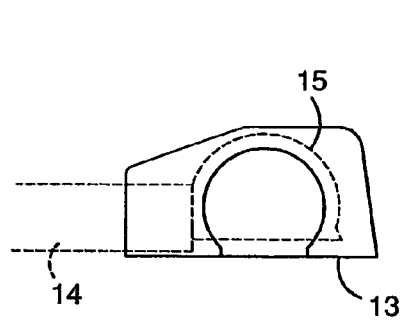
FIG. 4 is a side plan view of an adaptor of the apparatus in FIG. 3.
Figure 5:
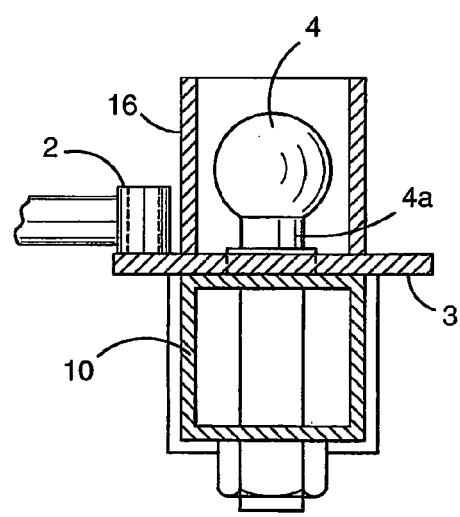
FIG. 5 is a cross-sectional view of a body of the apparatus in FIG. 3.

In order for the trailer arm to interact with the seat 16, and adaptor in the form of a housing 13 is fitted over the ball coupler 15 (FIG. 4). When the trailer arm 14 is hitched to the apparatus with the ball coupler 15 located on the tow ball 4, the housing 13 fits closely in the seats 16 so that horizontal angular movement of the trailer arm 14 is translated to the seat 16 and in turn, through the turntable to the shock absorber 11.

The housing 15 has a generally rectangular shape that is complimentary to the U-configuration of the seat 16 to ensure the interaction between the trailer arm 14 and seat 16. The housing 15 is applied to the arm 14 by a friction-fit or by a snap-fit and comprise any suitable rigid material for linking movement of the trailer to the shock absorber 11.

One form of shock absorber 11A suitable for use in the first and second embodiments described above is illustrated in FIG. 6A.

The shock absorber 11A comprises a generally cylindrical fluid-tight body 20 with an aperture through which a piston 30 extends. The piston 30 comprises a ram 32 and a head 34 that defines two chambers within the body. The head 34 includes apertures 36 through which fluid can flow between the two chambers upon movement of the ram 30 relative to the body 20.

While the shock absorber 11A is suitable for the invention, the resistance provided by the shock absorber 11A is constant, i.e. a given applied force is always met with the same resistance force. Accordingly, the resistance experience by a trailer is the same at low speeds and at high speeds of a vehicle for a given sway movement. If the resistance is too low, swaying of the trailer at high speeds will not be appropriately dampened. However, if the resistance is too high, removability of the trailer is reduced at low vehicular speeds, such as when navigating sharp bends in roads or parking the vehicle and trailer. Additionally, shock absorber 11A cannot be adjusted to account for differences in the size and weight of a trailer which, in part, dictate the level of resistance required.

Shock absorber 11B (FIG. 6B) enables the resistance to be adjusted. The shock absorber includes a body 20, a piston 40 with a ram 42 and a head 48. The ram 42 includes a metering pin 44 that is threaded for interacting with a thread on the ram 42. Orifices 46 in the ram 42 are disposed adjacent the head 48 and communicate with a tapered aperture 45. The flow rate of fluid through the tapered aperture 45 and orifices 46 is controlled by adjusting the position of the metering pin 44 within the tapered aperture 45. The position of the pin is adjusted by rotating the pin such that the threads on the pin 44 and the ram 42 cause the pin 44 to extend or to retract in the tapered aperture 45.

An alternative shock absorber 11C that enables adjustment of resistance provided by the shock absorber is illustrated in FIG. 6C. The shock absorber 11C comprises a body 20 and a piston 50 with a ram 52 and a head 54. The shock absorber 11C further include a wall 56 that defines a fluid flow channel 58 such that upon movement of the piston 50 fluid is caused to flow between chambers 59 and 59A through the channel 58.

Fluid flow through the channel 58 is controlled by a valve 55 that is adjustable. The valve 55 is manually adjustable to increase fluid flow and thereby decrease resistance of the shock absorber 11C or to decrease fluid flow and thereby increase the resistance of the shock absorber 11C.

A further alternative form of shock absorber 11D is illustrated in FIG. 6D. The shock absorber 11D comprises a body 20 and piston 60 with a ram 62 and a head 64. The shock absorber 11D further includes a wall 66 that defines a fluid flow channel 68. Fluid flows through the channel when the shock absorber 11D is extended or contracted. The fluid flow through the channel 68 is controlled by a valve 65. The valve 65 is, in turn, controlled by a solenoid 67 that is actuated by a control module 63. The control module 63 enables the solenoid 67, and hence, the resistance of the shock absorber 11D to be controlled electronically. Such electronic control may be remote from the shock absorber 11D, such as in the cabin of the vehicle. Accordingly, the shock absorber 11D may be controlled by a user in response to the size and weight of the trailer and the speed of the vehicle.

Alternatively, the control module 63 may be linked to a computer of the vehicle for control according to a range of parameters, including speed of the vehicle and the condition of the road.

For example, the control module 63 may be operated to control the valve 65 to prevent all fluid flow through the channel 68, thereby locking the trailer in a selected position behind the vehicle. For example, this enables greater control at high speeds when the effects of sway are more prevalent and more serious and, assist with controlling the direction of the trailer when reversing.

The position of the piston in the shock absorber 11, and thus the angle of the towed trailer, can be monitored by sensors placed either on the shock absorber 11 or turntable 3. Indication of the position of the trailer assists in preventing trailer sway and also provides an indication to the driver when the trailer is being reversed by the vehicle of where the trailer is relative to the vehicle.

Reference to any prior art in the specification is not, and should not be taken as, an acknowledgment or any form of suggestion that this prior art forms part of the common general knowledge in Australia or any other country.

Many modifications may be made to the preferred embodiment of the present invention as described above without departing from the spirit and scope of the present invention.

The invention claimed is:

1. An apparatus that reduces sway of a trailer towed by a towing vehicle and has:
    a draw bar that has a main bar and a side bar that extends from the main bar;
    a first means that enables a draw arm of a trailer to be hitched to the main bar;
    a second means that enables the draw bar to be hitched to a vehicle;
    a body that is mounted on the draw bar and rotates with respect to the draw bar;
    a slot on the body that is sized to receive the draw arm of the trailer and is sufficiently open above to permit the draw arm to move in the slot through a vertical angular displacement;
    a pair of spaced apart members that define the lateral edges of the slot, and are positioned closely adjacent to the draw arm of the trailer when the draw arm is received in the slot such that horizontal angular movement of the draw arm relative to the main bar of the apparatus causes a substantially equivalent horizontal angular movement of the body relative to the main bar; and
    a hydraulic means that links the body and the side bar such that horizontal movement of the body relative to the main bar is dampened, thereby dampening horizontal angular movement of the trailer with respect to the vehicle.

2. An apparatus as defined claim 1, wherein the spaced apart members clamp the draw arm.

3. An apparatus as defined in claim 1, wherein the dampening means comprises a fluid-filled dampener and one end for the dampener is attached to the body and the other end of the dampener is attached to the side bar such that horizontal angular movement of the body changes a distance between ends of the dampener and causes the dampening means to dampen the horizontal angular movement.

4. An apparatus as defined in claim 1, wherein the resistance provided by the dampening means is adjustable.

5. An apparatus as defined in claim 4, wherein the resistance is controlled manually.

6. An apparatus as defined in claim 4, wherein a control means controls the resistance of the dampening means.

7. An apparatus as defined in claim 1, wherein the dampening means comprises a piston-type dampener comprising a fluid-filled body, a ram that extends into the body to define two chambers within the body, the ram having one or more than one aperture for the flow of fluid between the chambers and wherein the resistance of the dampener is controlled by adjusting the rate of fluid flow between the chambers.

8. An apparatus as defined in claim 7, wherein the fluid flow rate between the chambers is adjustable by controlling the size of the one or more than one aperture in the ram.

9. An apparatus as defined in claim 1, wherein the dampening means comprises a piston-type dampener comprising a fluid-filled body, a ram that extends into the body to define two chambers within the body, the ram cooperates with a wall disposed within the body to define the two chambers within the dampening means and the wall forms a channel linking the two chambers for fluid flow and wherein the resistance of the dampening means is controlled by a valve located in the channel.

10. An apparatus as defined in claim 9, wherein the valve is manually adjustable or is electronically adjustable from a remote location.

* * * * *